United States Patent [19]
Aspin

[11] 3,820,933
[45] June 28, 1974

[54] TREATMENT OF FILMS OF PLASTICS MATERIAL

[75] Inventor: Frank Metcalf Aspin, Knutsford, England

[73] Assignee: Shell Oil Company, New York, N.Y.

[22] Filed: June 15, 1972

[21] Appl. No.: 263,162

[30] Foreign Application Priority Data
June 17, 1971 Great Britain...................... 2833/71

[52] U.S. Cl.................. 425/367, 425/394, 425/384, 425/445
[51] Int. Cl. ............................................. B29c 15/00
[58] Field of Search .......... 425/394, 363, 367, 372, 425/66, 143, 384, 445

[56] References Cited
UNITED STATES PATENTS

| | | | |
|---|---|---|---|
| 2,317,447 | 4/1943 | Domigi......................... | 425/363 X |
| 3,129,457 | 4/1964 | Carter et al.................... | 425/363 X |
| 3,433,047 | 3/1969 | Powell.......................... | 425/363 X |
| 3,600,747 | 8/1971 | McCarty........................ | 425/367 X |
| 3,635,637 | 1/1972 | Bergendahl..................... | 425/363 |

*Primary Examiner*—Robert L. Spicer, Jr.
*Attorney, Agent, or Firm*—Norris E. Faringer

[57] ABSTRACT

There is disclosed an improved machine suitable for treating films of plastics material, such as polypropylene, so that the film, after its initial production and before stretching, is on passing through the machine, modified so as to make it, on stretching, readily reducible to strand form of a required cross-section.

Basically the improved machine includes a pair of co-operating rollers, means for bringing the rollers together to form a nip through which such a film of plastics material may pass, means for adjusting the nip pressure, means for rotating each of the rollers at selected speeds, means for controlling the temperature of the rollers, and peripheral formations on at least one of the rollers whereby the film on passing through the nip may have its cross-sectional shape modified to provide alternately across its width enlarged portions from which strand forms will be produced, and portions of reduced thickness which serve to preserve the transverse continuity of the film for the time being.

Also disclosed are various roller constructions. In one construction there is a stationary cylindrical support, a close-fitting annular rotor carried thereby, generally axial cavities being provided between the two, and means for circulating cooling or heating liquid through certain cavities in one direction and through other cavities in the other direction. The rotor may be supported on the support for rotation by a hydrostatic bearing arrangement. One feature of this can consist in the use of axial cavities to carry bearing liquid and thereby give radial support. For axial bearing support there may be provided, on the support, an annular portion of enlarged diameter which fits in a groove in the rotor, passages being provided to supply bearing liquid between the sides of the annular member and the groove.

7 Claims, 11 Drawing Figures

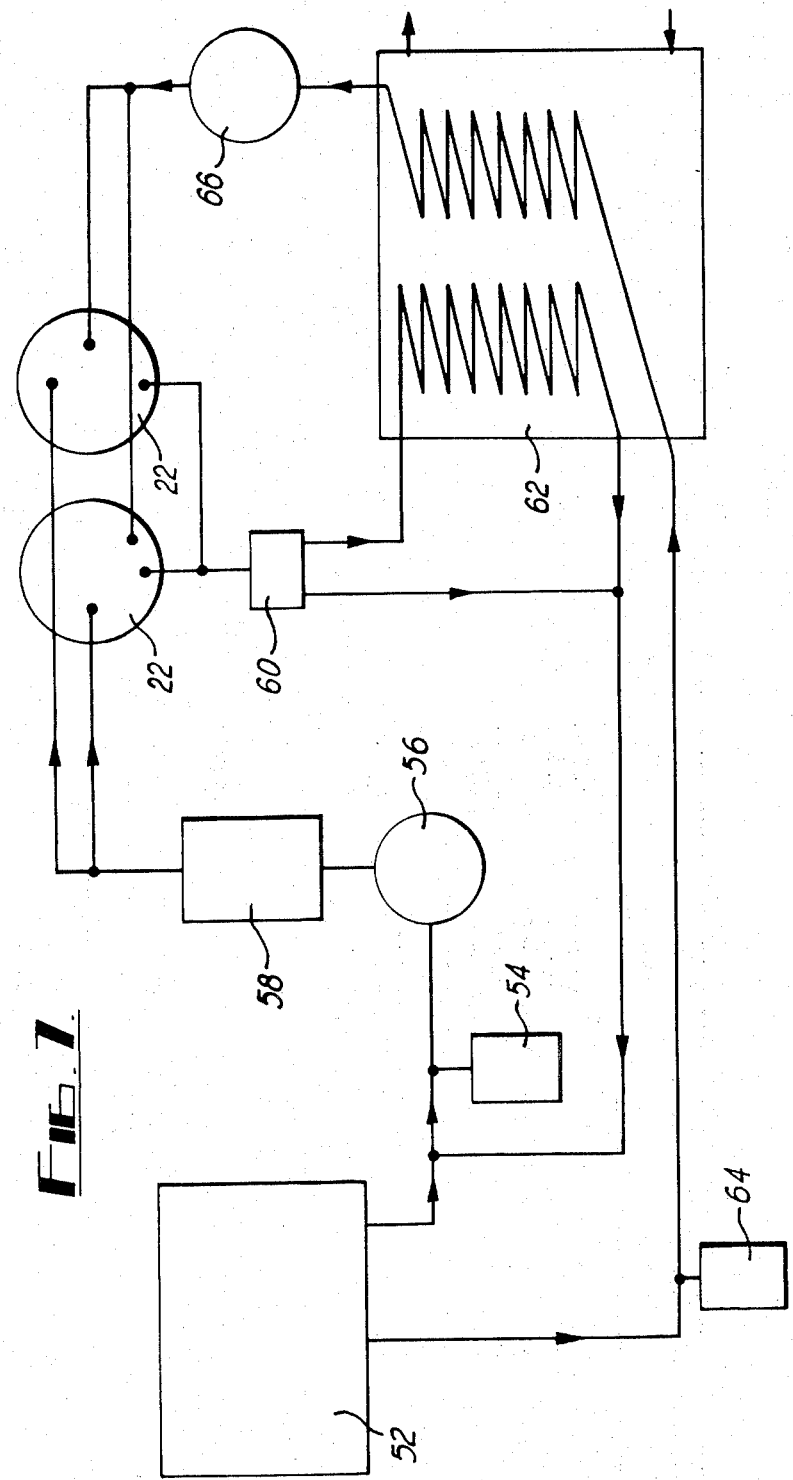

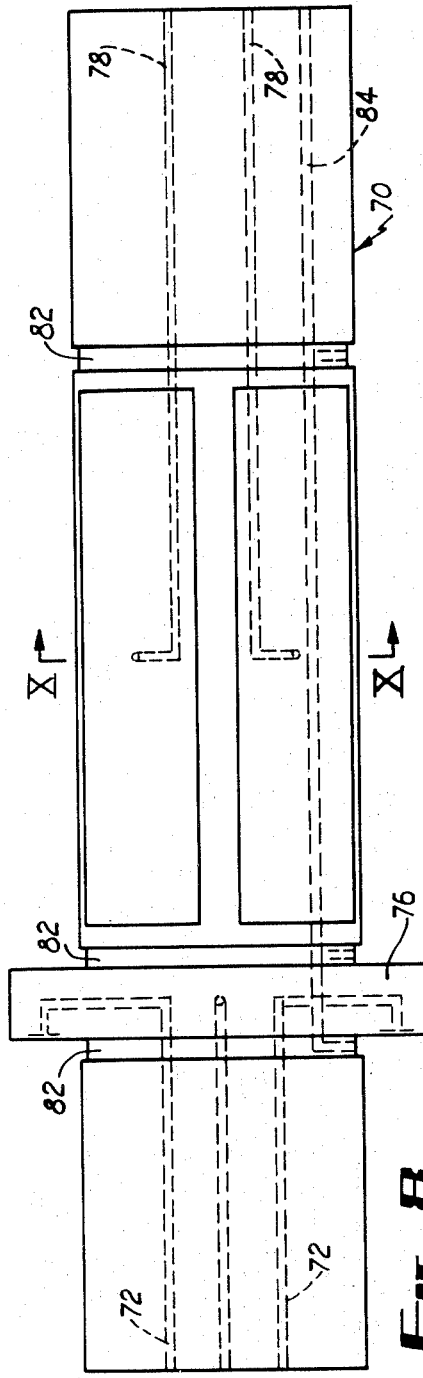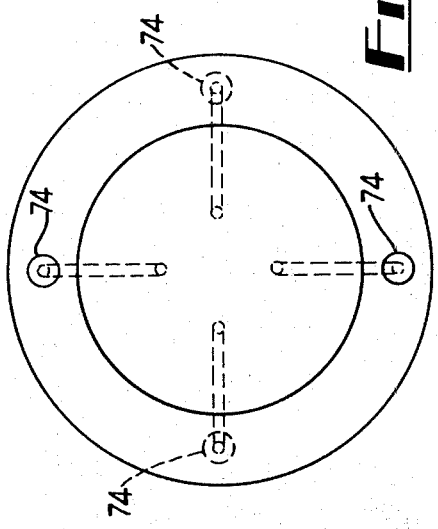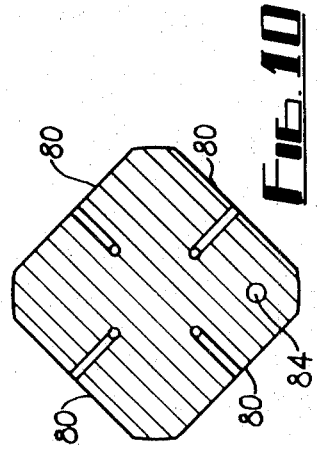

3,820,933

TREATMENT OF FILMS OF PLASTICS MATERIAL

This invention concerns the treatment of films of plastics material, such as polypropylene, which can be produced with such characteristics that when stretched in a given direction by an appropriate amount and under appropriate conditions become so weakened in a direction transverse to the direction of stretch that they can readily be divided to provide longitudinal strands, and so strengthened in the direction of stretch that the strands have a strength adequate for textile applications (hereinafter called "films of plastics material of the type described"). The words "textile applications" are to be understood in a broad sense: for example the conversion of the strands into, or the use of the strands as, cord, twine, thread and yarn is contemplated.

The object of the present invention is to provide an improved machine suitable for treating films of plastics material of the type described so that the film, after its initial production and before stretching is, on passing through the machine, modified so as to make it, on stretching, readily reducible to strandform of a required cross-section.

According to the present invention a machine suitable for this purpose includes a pair of co-operating rollers, means for bringing said rollers together to form a nip through which a film of plastics material of the type described may pass, means for adjusting the nip pressure, means for rotating each of said rollers at selected speeds, means for controlling the temperature of said rollers as required, and peripheral formations on at least one of said rollers whereby the film on passing through said nip may have its cross-sectional shape modified to provide alternately across its width enlarged portions from which said strand-forms will be produced, and portions of reduced thickness which serve to preserve the transverse continuity of the film for the time being. Preferably means are also provided to raise and lower the rollers. The separate means for controlling the various parameters may be hydraulic or pneumatic (as is for example preferred for adjusting the relative position of the rollers and the pressure therebetween), electrical (as is preferred, for example, for adjusting the roller speeds), or both hydraulic or pneumatic and electrical means may be employed.

It has been found necessary, in order to obtain optimum results, when passing a film of plastics material of the type described through the nip of a pair of rollers to modify its cross-sectional shape in the manner set out hereinbefore, that the temperature of the rollers should be controlled so as to be constant along the length thereof whether the film is to be heated or cooled. The film needs to be cooled if it is fed to the nip of the rollers on extrusion, and to be heated if it is fed thereto at a later stage after extrusion, or if cast.

According, therefore, to another feature of the invention, a roller assembly includes a fixed cylindrical support, an annular member mounted in close-fitting rotary relationship thereon, there being at least one pair of oppositely disposed cavities between said support and said annular member extending in a generally axial direction, and passageways in said support whereby cooling or heating liquid may be fed continuously in one direction along one cavity or alternate or alternate groups of cavities, and in the other direction along the remaining cavity or cavities. In this way the balanced counterflow of cooling or heating liquid can prevent any appreciable temperature gradient from one end of the roller to the other.

It has also been found important, for optimum results, that axial and/or radial movement of the rollers must be minimal whilst rotary movement remains free and constant. Axial movement must be especially restricted when a pair of rollers with closely-spaced complementary peripheral formations are in use.

According, therefore, to yet another feature of the invention, a roller assembly includes a fixed cylindrical support, an annular member mounted in close-fitting rotary relationship thereon, there being at least one pair of oppositely disposed cavities between said support and said annular member, extending in a generally axial direction, and passageways in said support whereby a bearing liquid may be supplied thereto, and there being, alternatively or additionally, at least one annular portion of enlarged diameter on said support in close fitting relationship with the sides of a corresponding annular groove, of somewhat greater diameter still, in said rotary member, annular cavities between the close-fitting sides of said annular portion and said groove, and passageways in said support whereby a bearing liquid may be supplied thereto.

The invention will now be described further, by way of example only, with reference to the accompanying drawings, in which:

FIG. 7 is a line diagram of the hydraulic circuit of the machine shown in FIG. 1;

FIG. 8 is an elevation of an alternative roller support,

FIG. 9 is an end view from the left of FIG. 8;

FIG. 10 is a sectional end view on the line X—X of FIG. 8, and

Figure 1:
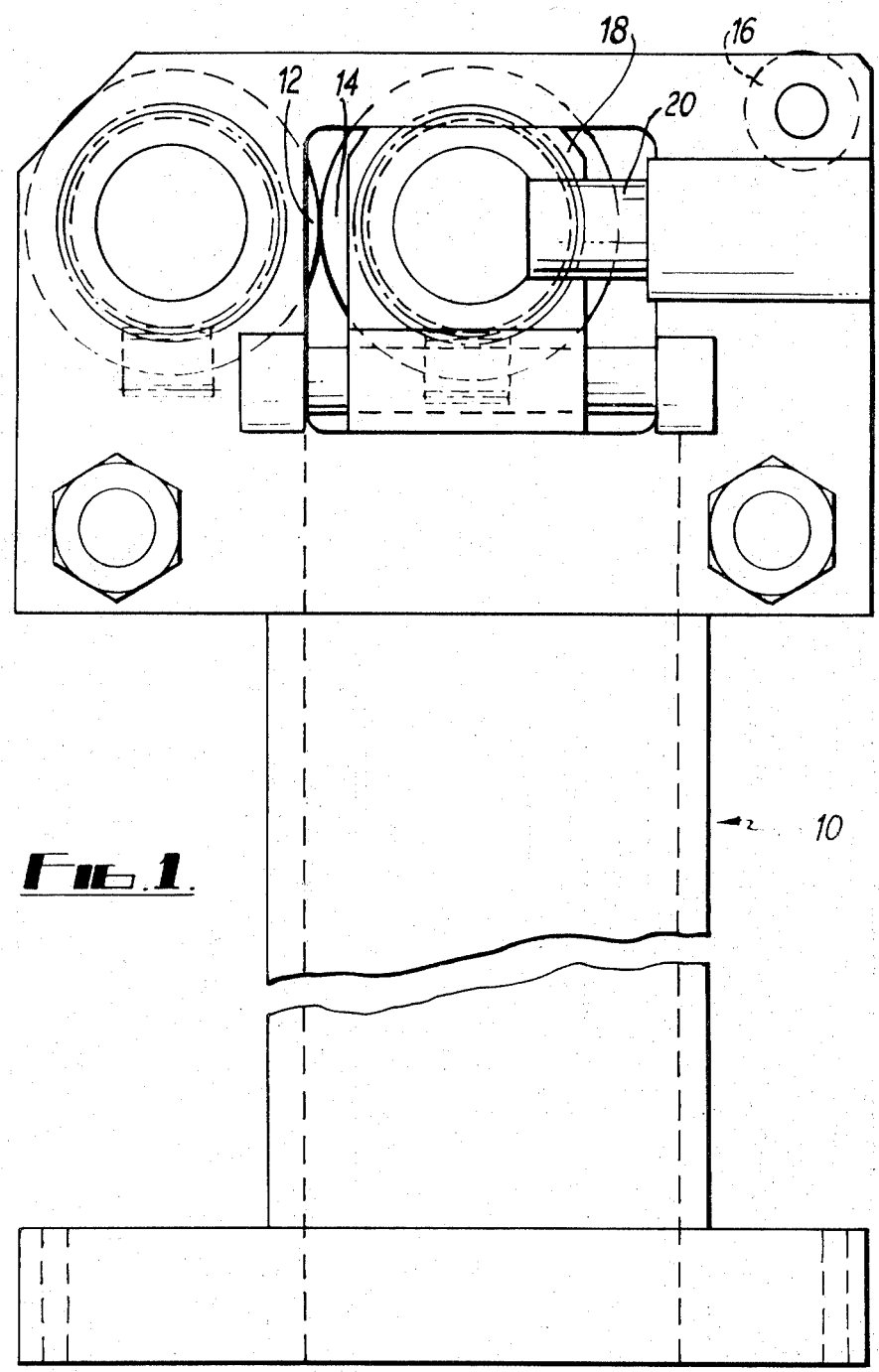
FIG. 1 is a diagram showing the general outline of a machine incorporating the various features of the invention.
Figure 2:
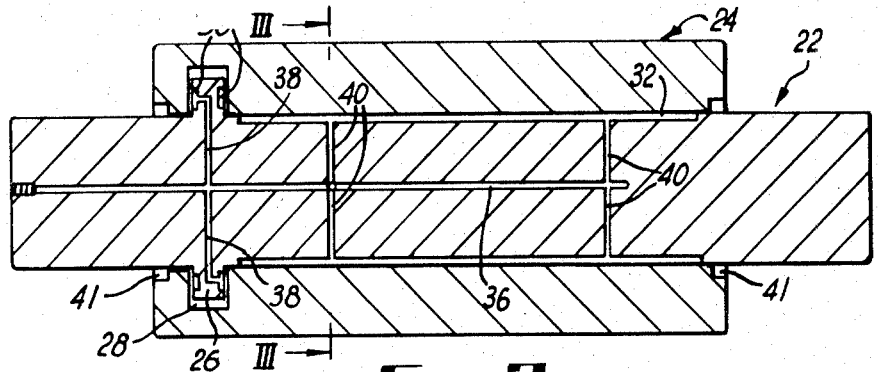
FIG. 2 is a sectional elevation, on the line II—II of FIG. 3, of one of the main rollers of the machine shown in FIG. 1, and showing the axial and radial bearing arrangements.
Figures 3, 6:
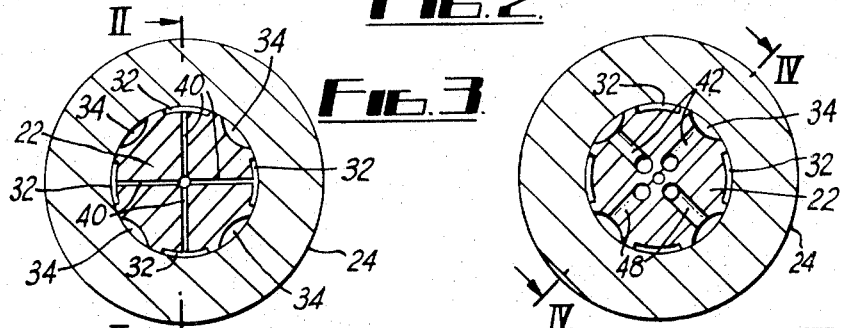
FIG. 3 is a sectional end view on the line III—III of FIG. 2.
FIG. 6 is a sectional end view on the line VI—VI of FIG. 4.

Referring firstly to FIG. 1 the machine comprises essentially a framework 10 in which are carried two working rollers 12, 14 and one idler roller 16. The roller 14 has machined in its periphery a series of closely spaced annular grooves of generally V-section with a small land between each. These grooves, owing to their small size, are not shown in the drawings. There may be say 40 such grooves to the inch, each about 0.020 inches deep and with a land of less than 0.001 inches between each. The surface of the other roller is flat. Little of the ancilliary structure is shown in FIG. 1. However, the roller 14 is mounted on a horizontally movable part 18 of the framework, and this is adjusted by means of an hydraulic ram 20. In operative state the ram 20 has caused the roller 14, as shown, to come into contact with the roller 12, so as to pressurize the nip therebetween to a load of many thousands of pounds. The rollers 12, 14 are worm driven in opposite directions by hydraulic or electrical means in an adjustable manner. The upper part of the framework 10 which supports the rollers 12, 14, 16 is adjustable in a horizontal direction also by hydraulic means (not shown). In employing the machine to process a film of plastics material of the type described the film may be led direct from an extruder vertically downwards to the nip between rollers 12, 14 and led off over the idler roller 16. Alternatively a cast film may be led beneath the roller 12 and then upwardly to the nip between rollers 12, 14 and away over the idler roller 16. In the former case the rollers 12, 14 are cooled as later described, and in the latter case heated as later described, in both cases so that the film is capable of having its cross-section modified to present spaced enlarged portions connected by very thin portions. After emerging from the machine the film is passed to further apparatus where it is stretched and the enlarged portions caused to separate into discrete strand-like elements before conversion, for example, into twine or cord.

Both rollers are constructed as shown in FIGS. 2 to 6 (apart from the peripheral grooves on one of them) and therefore only one will be described.

The roller assembly is in two parts, a fixed cylindrical support 22 and an annular rotor 24 mounted thereon. Towards one end of the support 22 is an annular portion 26 of enlarged diameter and of short axial extent. This portion 26 is accommodated in a corresponding annular groove 28 in the rotor 24. The rotor 24 is a close but free fit on the support 22 and the sides of the annular portion 26 of the support 22 are a close but free fit with the adjacent sides of the groove 28 in the rotor 24. There is a substantial clearance between the periphery of the annular portion 26 and the bottom of the groove 28. In each side of the annular portion 26 is a shallow annular groove 30.

Eight axial cavities are formed between the support 22 and the rotor 24 by longitudinal grooves in the periphery of the support 22. These are equispaced, four alternate grooves 32 being very shallow and the four grooves 34 being of arcuate form and substantially deeper.

The grooves 30, 32 are provided to carry oil under high pressure to form axial and radial hydrostatic bearings. The oil is supplied to the support 22 through an axial passageway 36 and thence to grooves 30 by branch passageways 38 (FIG. 2) and to grooves 32 by branch passageways 40. As will be apparent both the axial and radial hydrostatic bearing arrangements tend to be strongly self-equalising in response to excess axial load in either direction and the nip pressurization, respectively. Fluid seals 41 are provided at either end of the support 24.

The grooves 34 are provided to carry oil circulating under low pressure for cooling or heating purposes. Oil is supplied (FIG. 4) to two passageways 42 at one end of the support 22, each feeding one groove 34, and leaves by two similar passageways 44 at the other end of the support 22. Oil is also supplied to two passageways 46 at the other end of the support, each feeding one of the remaining grooves 34, and leaves by two similar passageways 48 at the one end of the roller. Thus cooling or heating oil passes in contra-flow along the roller assembly and this enables undesirable temperature gradients along the assembly to be avoided.

Figure 4:
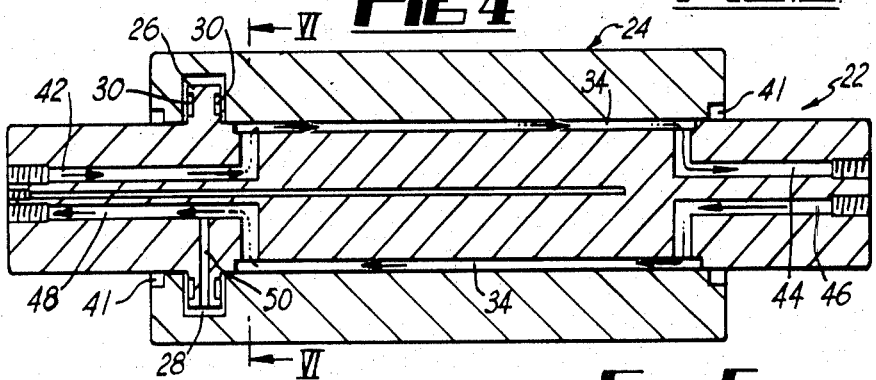
FIG. 4 is a sectional elevation, on the line IV—IV of FIG. 6, of the same roller, and showing the temperature control arrangements.
Figure 5:
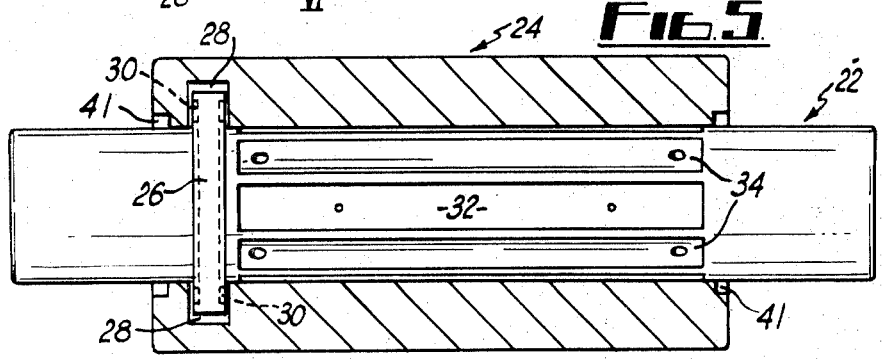
FIG. 5 is a part-sectional elevation on the line II—II of FIG. 3.

Leakage of high pressure oil from the axial bearing is to the annular space between the annular portion 26 and the groove 28, and is conducted away to the low pressure system via passageway 50 (FIG. 4). Leakage of oil from grooves 32 to the lower pressure system is over the periphery of the support 22 to grooves 34.

It will be clear that the number and disposition of the various grooves and passageways can be altered with wide limits. Also the grooves 32 may be interrupted instead of continuous, in which case, of course separate feeder passageways will be needed for the respective groove segments. Another possibility is that the grooves, or some of them, could be helical. It is also to be understood that either the bearing system or the heating/cooling system could be used, without the other.

Referring to FIG. 7 for the details of the hydraulic circuit, a reservoir 52 is provided for a common oil supply. From it oil passes to a low-pressure line and a high pressure line respectively. In the lower pressure line, fitted with a filter 54, the oil passes through a low pressure pump 56, then through a thermostatically controlled heating or cooling unit 58, and then to the input ends of the low-pressure passageways in the supports 22 (one only in each support 22 being shown in FIG. 7 for the sake of simplicity). On emergence at the other ends the oil passes back to the beginning of the line via a thermostatically controlled valve 60 and, if necessary, through a heat exchanger 62. In the high pressure line, also provided with a filter 64, the oil passes through the heat exchanger 62, then through a high pressure pump 66, and then to the input end of the high pressure passageway in each support 22. As already explained leakage passes back into the low-pressure system. It will be clear that with this fairly simple general arrangement both high and low pressure systems are kept supplied from a common source and with accurate temperate and pressure control.

Turning now to FIGS. 8 to 11 there is illustrated an alternative roller support 70 and hydraulic system for use therewith.

The support 70 has four passageways 72 extending from one end thereof for feeding bearing liquid to form outlets 74 in an annular portion 76 of enlarged diameter. Two outlets 74 are in one face of the annular portion 76 and two outlets 74 are in the other face thereof. Four passageways 78 extend from the other end of support 70 for feeding bearing liquid to four flats 80 machined on the support and which form, together with the annular rotor (not shown in FIGS. 8 to 10) axial cavities.

Drainage grooves 82 are provided in the support 70 and a drainage passageway 84 leads therefrom to the end of the support.

Figure 11:
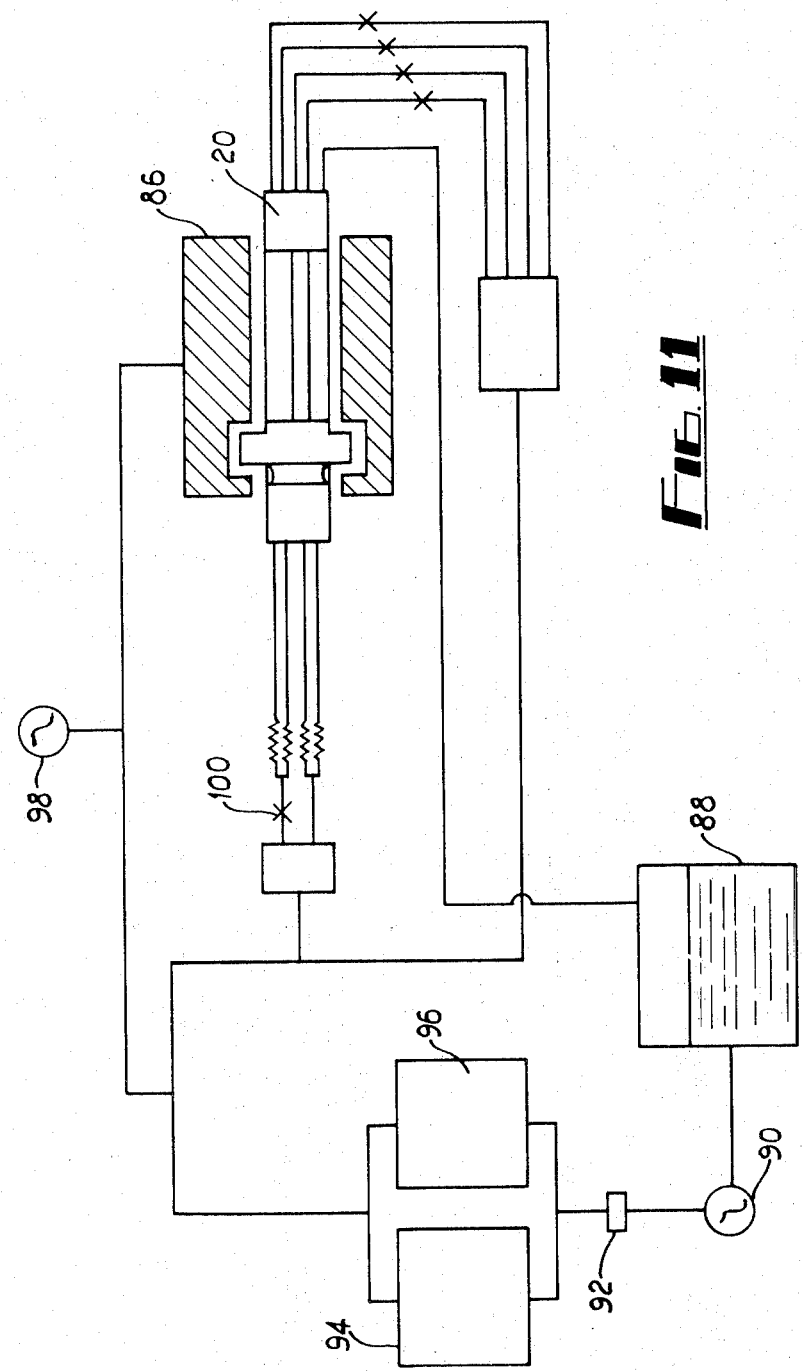
FIG. 11 is a line diagram of the hydraulic circuit when using the roller support of FIGS. 8 to 10.

Referring to FIG. 11 the support 70 with its annular rotor 86 are shown diagrammatically along with the associated hydraulic circuit. A reservoir 88 is provided for a common oil supply. From it oil passes to a pump 90 and a filter 92. From the filter it goes through either a cooler 94 or a heater 96, after which its pressure is sensed by a limit switch device 88 which prevents rotation of the rotor 86 if the pressure is insufficient. The rate of flow apportions itself between the two ends of the support 70. Flow entering one end through lines leading to passageways 72 (FIGS. 8 - 10) goes to the annular portion 76, and a needle valve 100 is provided in the lines leading to the two outlets 74 on one face of the portion 76. Flow entering the other end through lines leading to passageways 78 feeds the flats 80 and the cavities formed thereby. Both flows pass to drainage grooves 82 and drainage passageway 84 to be returned to the reservoir 88 for recirculation.

The needle valve 100 enables the axial position of the rotor 86 to be adjusted to very fine limits indeed with the valve 100 fully open the portion 76 is maintained centrally within the groove in the support 86. Any closure of the valve 100 results in axial movement of the support 86 to a position in which the pressures on each side of the portion 76 are equal.

By appropriately dimensioning the various parts a good flow of liquid through the cavities formed by the flats 80 can be achieved and as a result accurate temperature control. It will be noted that the liquid is fed centrally of these flats with flow to each end of the rotor 86 thereafter. In a modification two flats 80 could be fed at one end and two at the other, thus encouraging contra-flow for heating or cooling purposes.

The embodiment just described is especially applicable when applied to two rollers in a machine which have complementary formations such as very finely spaced grooves which must register accurately in use, because of the facility for precise axial adjustment of the rotor 86. The hydraulic circuit, is generally speaking, simpler than that illustrated in FIG. 7.

Although reference has been made to machines having two rollers, the use of more than two rollers is not precluded. For example two pairs of rollers may be incorporated, to facilitate the processing of a film produced continuously in annular form, this being slit at each side as it is brought to the machine, one of the resulting sheets going to one pair of rollers and the other sheet to the other pair of rollers.

I claim:

1. A machine suitable for treating films of plastics material of the type described so that the film, after its initial production and before stretching, is, on passing through the machine, modified so as to make it, on stretching, readily reducible to strand form of a required cross-section, comprising a pair of co-operating rollers, means for bringing said rollers together to form a nip through which such a film of plastics material may pass, means for adjusting the nip pressure, means for rotating each of said rollers at selected speeds, means for controlling the temperature of said rollers as required, and peripheral formations on at least one of said rollers whereby the film on passing through said nip may have its cross-sectional shape modified to provide alternately across its width enlarged portions from which said strand forms will be produced, and portions of reduced thickness which serve to preserve the transverse continuity of the film for the time being.

2. A machine as claimed in claim 1 further comprising means for raising and lowering the rollers.

3. A machine as claimed in claim 1 in which the means for adjusting the relative position of the rollers is hydraulic or pneumatic.

4. A machine as claimed in claim 1 in which the means for adjusting the nip pressure is hydraulic or pneumatic.

5. A machine as claimed in claim 1 in which the means for rotating the rollers at selected speeds is electrical.

6. A machine as in claim 1 wherein at least one roller includes a fixed cylindrical support, an annular member mounted in close-fitting rotary relationship thereon, at least one pair of oppositely disposed cavities between said support and said annular member extending in a generally axial direction, and passageways in said support whereby cooling or heating liquid may be fed continuously in one direction along at least one cavity and in the other direction along the remaining cavities.

7. A machine as in claim 6 wherein the cavity in the roller comprises a groove or flat extending along the length of said support.

* * * * *